(12) United States Patent
Blank et al.

(10) Patent No.: US 8,438,661 B2
(45) Date of Patent: May 7, 2013

(54) SCANNING PROBE MICROSCOPE

(75) Inventors: David Hermanus Adrianus Blank, Enschede (NL); Augustinus Josephus Helena Maria Rijnders, Lichtenvoorde (NL); Joska Johannes Broekmaat, Nijmegen (NL); Frank Johan Gerhardus Roesthuis, Oldenzaal (NL)

(73) Assignee: Universiteit Twente (NL)

( * ) Notice: Subject to any disclaimer, the term of this patent is extended or adjusted under 35 U.S.C. 154(b) by 617 days.

(21) Appl. No.: 12/446,152

(22) PCT Filed: Oct. 18, 2007

(86) PCT No.: PCT/EP2007/009168
§ 371 (c)(1),
(2), (4) Date: Jun. 2, 2010

(87) PCT Pub. No.: WO2008/049570
PCT Pub. Date: May 2, 2008

(65) Prior Publication Data
US 2010/0242142 A1 Sep. 23, 2010

(30) Foreign Application Priority Data
Oct. 23, 2006 (EP) .................................. 06076925

(51) Int. Cl.
*G01Q 30/20* (2010.01)
(52) U.S. Cl.
USPC ............................................. 850/18; 977/851
(58) Field of Classification Search .............. 850/18; 250/442.11; 977/851
See application file for complete search history.

(56) References Cited

U.S. PATENT DOCUMENTS
5,103,095 A * 4/1992 Elings et al. .................... 850/18

FOREIGN PATENT DOCUMENTS
| EP | 0653628 | | 5/1995 |
| JP | 7306212 | | 11/1995 |
| JP | 07306212 A | * | 11/1995 |
| JP | 2002031589 | | 1/2002 |
| JP | 2002031589 A | * | 1/2002 |
| WO | 0191855 | | 12/2001 |

OTHER PUBLICATIONS

Carpick et al., "Measurements of in-plane material properties with scanning probe microscopy" MRS Bulletin Mater. Res. Soc. USA (2004) pp. 472-477.
Nafisi et al., "Sample mounting and transfer for coupling an ultrahigh vacuum variable temperature beetle scanning tunneling microscope with conventional surface probes" Review of Scientific Instruments, American Institute of Physics, US. vol. 2, No. 1 (2001) ppl. 157-162.
Whitman et al., "Versatile sample handling system for scanning tunneling microscopy studies of molecular beam epitaxy" Journal of Vacuum Science and Technology, vol. 14, No. 3 (1996). pp. 1870-1872.

* cited by examiner

*Primary Examiner* — Jack Berman
(74) *Attorney, Agent, or Firm* — Bozicevic, Field & Francis LLP; Bret E. Field

(57) ABSTRACT

The invention relates to a scanning probe microscope comprising: a specimen holder holding a specimen; and a probe for scanning the relief of the upper surface of the specimen, which probe is movable in a vertical direction and two orthogonal horizontal directions, wherein the upper surface of the specimen is tilted relative to at least one of the two orthogonal horizontal directions.

11 Claims, 2 Drawing Sheets

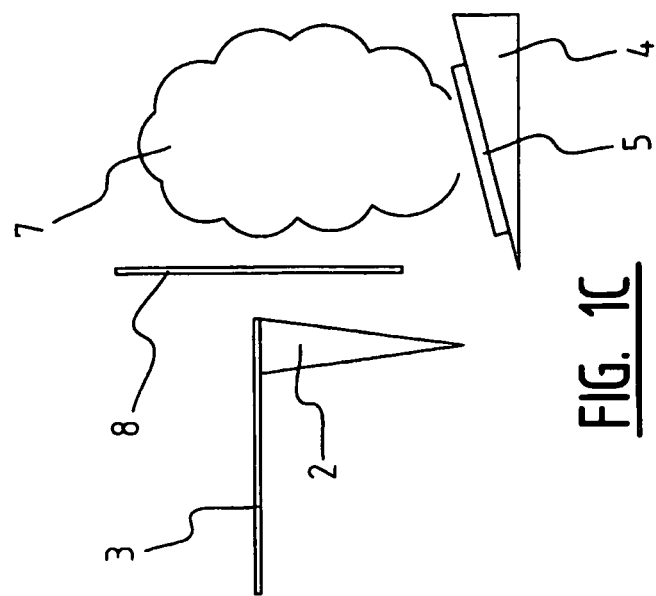
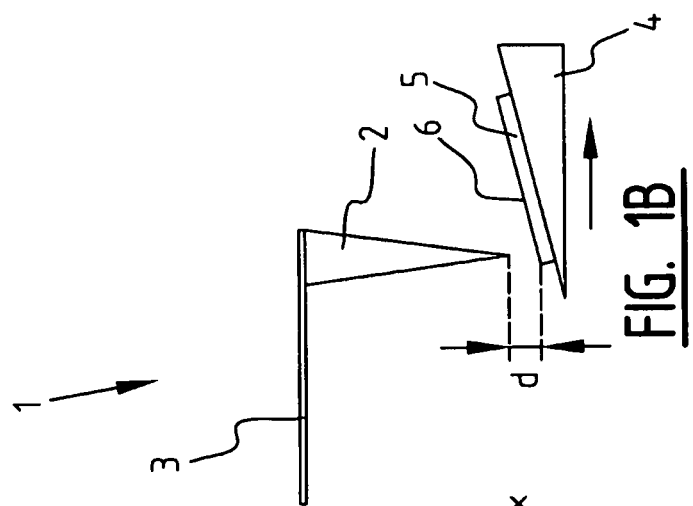
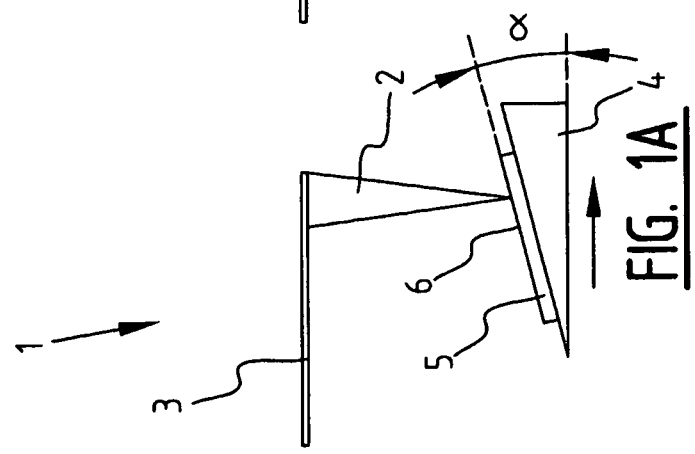

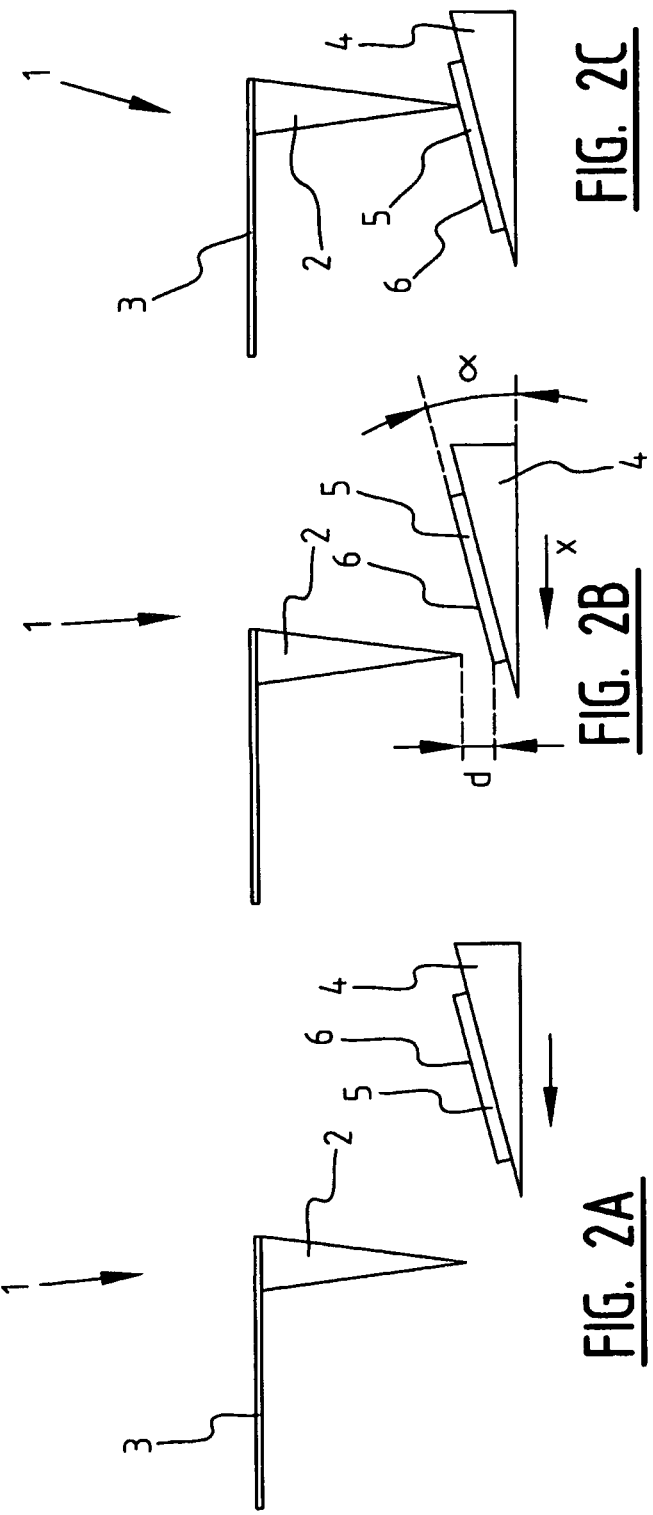

SCANNING PROBE MICROSCOPE

The invention relates to a scanning probe microscope comprising:
- a specimen holder holding a specimen; and
- a probe for scanning the relief of the upper surface of the specimen, which probe is movable in a vertical direction and two orthogonal horizontal directions.

A scanning probe microscope performs measurements at a number of measuring points generally in the form of a matrix. The scanning probe microscope measures at each measuring point the interaction between a probe and the surface. Based on this interaction, which can be a force or a tunneling current, the relief of a surface can be visualized. Measuring accuracy is in the range of 1-0.01 nm. With such a scanning probe microscope it is possible to check processes at molecular level. For example bacterial or chemical specimens can be checked or the quality of an ultra thin layer arranged by for example physical vapor deposition.

A drawback of current scanning probe microscopes is the time necessary for scanning one surface. After inserting a specimen in a specimen holder the probe has to approach the surface within a distance of approximately 1-200 nm. As the probe has a distance to the specimen surface, when loading the specimen, of several millimeters, it will take a while before the probe has approached the surface in a safe way. This generally takes about 10 minutes. Scanning of the surface then takes less time. Especially with newly developed technology it is possible to scan a surface of 512 by 512 measuring points within about 1 minute. So most of the time is consumed by placing the probe at the appropriate distance from the surface of the specimen.

Due to this disadvantage it is currently not possible to scan a large number of specimens within a small time frame, which is necessary when this technique is to be used in a commercial production process.

It is therefor an object of the invention to at least partially remove the above-mentioned disadvantage.

This object is achieved by a scanning probe microscope according to the invention, which is characterized in that the upper surface of the specimen is tilted relative to at least one of the two orthogonal horizontal directions.

By tilting the upper surface of the specimen relative to at least one of the two orthogonal horizontal directions, it is possible to retract the specimen from the scanning probe microscope without damaging the probe. By retracting the specimen in the direction in which the surface is inclined it is ensured that the distance between the probe and the specimen surface will always increase. Depending on the inclination of the specimen surface a substantial shift in horizontal direction will result in a small change in height of the probe relative to the specimen surface. This advantage is used when inserting the specimen back into the scanning probe microscope. A displacement of several millimeters will result in only a very small height difference in vertical direction, depending on the angle. As a scanning probe microscope is generally able to compensate for small differences in height, it is possible to tune the angle such that height differences resulting from displacement in horizontal direction can be compensated by the scanning probe microscope.

The result of the invention is that a relative displacement of the scanning probe in vertical direction is no longer necessary to extract and insert a specimen. The long and tedeous way of having the probe approach the specimen surface in vertical direction is eliminated with this invention. This provides the possibility to treat the surface of a specimen outside of the scanning probe microscope, to check the result of the treatment and to again perform an additional treatment outside of the scanning probe microscope. This would only take a small amount of time compared to a method using a prior art scanning probe microscope.

In a preferred embodiment of the scanning probe microscope according to the invention, the specimen holder is tilted relative to at least one of the two orthogonal horizontal directions. Specimens have generally parallel upper and bottom surfaces and for such specimens it is sufficient to have the specimen holder tilted to have the advantage of the invention.

In a preferred embodiment of the scanning probe microscope according to the invention, the tilted angle is in the range of $0.5°-2°$.

In a very preferred embodiment of the scanning probe microscope according to the invention, the specimen holder is removable in a horizontal direction perpendicular to the tilting axis. This provides for the possibility to load several specimen holders with specimens and insert each specimen holder with a specimen arranged thereon one after the other. This would enable the use of the scanning probe microscope in a production line.

The invention further relates to a method for scanning the relief of a surface of a specimen with a scanning probe microscope according to the above-mentioned preferred embodiment. This method comprises the steps of:
- arranging a specimen in the specimen holder;
- have the probe approach the surface of the specimen in the vertical direction;
- scan the relief of the surface of the specimen by moving the probe in the two orthogonal horizontal directions; and
- remove the specimen holder in the horizontal direction perpendicular to the tilting axis.

In a preferred embodiment, the method further comprises the steps of:
- after removing the specimen holder, performing an operation on the specimen; and
- inserting the specimen holder in the scanning probe microscope in the horizontal direction perpendicular to the tilting axis.

The performed operation could be exchanging the specimen arranged on the specimen holder or performing a treatment of the surface of the specimen such as a deposition treatment or an etching treatment.

In another preferred embodiment of the method according to the invention, the method comprises the step of correcting the horizontal position of the repositioned specimen relative to the probe. When a surface area of the specimen has to be rescanned, it is necessary that after reinserting the specimen the same area is positioned underneath the probe.

In a preferred embodiment according to the invention, the correction of the horizontal position of the specimen is controlled by the feedback of the vertical adjustment of the probe. The probe has to adjust upwardly in order not to contact the surface of the specimen, the specimen is obviously inserted too far in the horizontal direction. This provides a feedback for the horizontal position of the specimen.

In yet another embodiment of the method according to the invention the correction of the horizontal position of the specimen is controlled by the detection of a marker on the surface of the specimen. Preferably this marker is detected by performing a rough surface scan of the specimen with probe. With the rough scan the marker can be detected and it can be calculated which adjustments have to be performed.

It is possible to use these correction steps also for the positioning of other objects. In such case the specimen is a specifically designed surface ranged on a object and the feedback with the marker or height adjustment of the probe are used to position the object with a very high accuracy.

These and other advantages of the invention will be elucidated in conjunction with the accompanying drawings.

FIGS. 1A-1C show a schematic view of a method according to the invention in which a specimen holder is retracted from a scanning probe microscope according to the invention.

FIGS. 2A-2C show in a schematic way the insertion of a specimen holder.

In FIG. 1A a scanning probe microscope 1 according to the invention is shown. A probe 2 is suspended from a cantilever 3. A specimen holder 4 has a specimen 5 arranged of which the surface 6 is scanned by the probe 2. The surface 6 of the specimen 5 is tilted under an angle $\alpha$. The angle $\alpha$ shown in the figures is exaggerated. This angle is typically 0.5°-2°.

When the specimen holder 4 is retracted, as shown in FIG. 1B the cantilever 3 with the probe 2 can stay in position while the distance d between the tip of the probe 2 and the surface 6 of the specimen 5 increases.

When the specimen holder 4 is fully retracted, an operation can be performed on the specimen 5 for example the deposition of a vapor 7. As the specimen holder 4 is retracted the scanning probe 2 can be shielded off by a shield 8 or the specimen holder 4 can be transported to a completely different room.

When the operation has been performed on the surface 6 of the specimen 5, the specimen holder 4 can be inserted back into the scanning probe microscope 1 (see FIG. 2A). When the specimen holder 4 is displaced over distance x the distance d between the tip of the probe 2 and the surface 6 of the specimen 5 will decrease. The relation will be $\Delta d = x \cdot \tan \alpha$.

So it is possible to move the specimen holder 4 back at high speed, while the distance d decreases at a low speed, which can be compensated by the controls of the probe 2. As shown in FIG. 2C the specimen holder 4 is again placed back under the scanning probe 2 and the surface 6 of the specimen 5 can again be scanned.

The invention claimed is:

1. A scanning probe microscope comprising:
   a specimen holder holding a specimen; and
   a probe for scanning the relief of the upper surface of the specimen, which probe is movable in a vertical direction and two orthogonal horizontal directions,
   the upper surface of the specimen arranged to be tilted relative to at least one of the two orthogonal horizontal directions during said scanning; and
   the specimen holder arranged to be moved from underneath the microscope in a horizontal direction perpendicular to the tilting axis and in the direction in which the upper surface of the specimen is inclined.

2. A scanning probe microscope according to claim 1, wherein the specimen holder is tilted relative to at least one of the two orthogonal horizontal directions.

3. A scanning probe microscope according to claim 1 or 2, wherein the tilting angle is in the range of 0.5°-2°.

4. A method for scanning the relief of a surface of a specimen with a scanning probe microscope according to one of the preceding claims 1-2, comprising the steps of:
   arranging a specimen in the specimen holder;
   the probe approaching the surface of the specimen in the vertical direction;
   scanning the relief of the surface of the specimen by moving the probe in the two orthogonal horizontal directions; and
   moving the specimen holder and specimen from underneath the microscope in the horizontal direction perpendicular to the tilting axis and in the direction in which the upper surface of the specimen is inclined.

5. A method according to claim 4, further comprising the steps of:
   after removing the specimen holder, performing an operation on the specimen; and
   inserting the specimen holder in the scanning probe microscope in the horizontal direction perpendicular to the tilting axis.

6. A method according to claim 5, wherein the operation performed on the specimen is exchanging the specimen.

7. A method according to claim 5, wherein the operation performed on the specimen is a treatment of the surface of the specimen.

8. A method according to claim 5, comprising the step of correcting the horizontal position of the repositioned specimen relative to the probe.

9. A method according to claim 8, wherein the correction of the horizontal position of the specimen is controlled by the feedback of the vertical adjustments of the probe.

10. A method according to claim 8, wherein correction of the horizontal position of the specimen is controlled by the detection of a marker on the surface of the specimen.

11. A method according to claim 10, wherein the detection of the marker is performed by scanning the specimen with the probe.

* * * * *